United States Patent
Primdahl et al.

(10) Patent No.: US 7,083,329 B2
(45) Date of Patent: Aug. 1, 2006

(54) METHOD OF MEASURING HIGH TEMPERATURES AND INSTRUMENT THEREFORE

(75) Inventors: Ivar I. Primdahl, deceased, late of Copenhagen (DK); by Helen Rose Primdahl, legal representative, Copenhagen (DK); Tommy Hansen, Tikøb (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 10/816,945

(22) Filed: Apr. 5, 2004

(65) Prior Publication Data

US 2004/0208229 A1    Oct. 21, 2004

(30) Foreign Application Priority Data

Apr. 19, 2003    (DK) .............................. 2003 00599

(51) Int. Cl.
*G01K 1/12* (2006.01)
*G01K 1/14* (2006.01)
*G01K 7/02* (2006.01)

(52) U.S. Cl. ............... 374/179; 374/208; 374/147; 136/230; 422/211

(58) Field of Classification Search ............... 374/179, 374/208, 141, 147, 148; 136/230, 242; 422/109, 422/190, 211
See application file for complete search history.

(56) References Cited

U.S. PATENT DOCUMENTS

| | | | | |
|---|---|---|---|---|
| 2,383,729 A | * | 8/1945 | Loy | 374/148 |
| 3,070,645 A | | 12/1962 | Tracht | 136/208 |
| 3,913,058 A | | 10/1975 | Nishio et al. | 338/28 |
| 4,311,671 A | * | 1/1982 | Notman | 422/148 |
| 4,822,570 A | * | 4/1989 | Lerman et al. | 422/119 |
| 5,005,986 A | * | 4/1991 | Najjar et al. | 374/179 |
| 5,070,024 A | | 12/1991 | Bruno | 436/139 |
| 5,125,793 A | | 6/1992 | MacArthur et al. | 415/114 |
| 5,143,647 A | * | 9/1992 | Say et al. | 518/707 |
| 5,192,132 A | * | 3/1993 | Pelensky | 374/179 |
| 5,232,517 A | * | 8/1993 | Hilborn et al. | 374/179 |
| 5,242,226 A | * | 9/1993 | Ross et al. | 374/208 |
| 5,429,809 A | * | 7/1995 | Stahl et al. | 422/211 |
| 5,595,719 A | * | 1/1997 | Ul-Haque et al. | 423/418.2 |

(Continued)

FOREIGN PATENT DOCUMENTS

DE    3613501 A1 * 10/1987

(Continued)

OTHER PUBLICATIONS

Cormier, J.M. and Rusu, I. F, "Syngas production via methane steam reforming with oxygen: plasma reactors versus chemical reactors." J. Phys.D:Appl. Phys. 34(18), p. 2798-803, Sep. 21, 2001.*

(Continued)

*Primary Examiner*—Gail Verbitsky
*Assistant Examiner*—Stanley J. Pruchnic, Jr.
(74) *Attorney, Agent, or Firm*—Dickstein Shapiro Morin & Oshinsky LLP

(57) ABSTRACT

A method for measurement of high temperatures of a process stream by means of a thermocouple arranged in a thermowell. The thermowell is at least partly covered by a layer of a catalytic material which is active in at least one endothermic reaction. The thermowell is installed in a reactor by inserting the thermowell through a hole penetrating the reactor wall so that the tip of the thermowell is in contact with the process stream. The invention is typically used where the reaction is a reforming reaction and the reactor is an autothermal reformer fed with a hydrocarbon stream and an oxygen containing stream.

11 Claims, 2 Drawing Sheets

U.S. PATENT DOCUMENTS

| | | | |
|---|---|---|---|
| 6,277,894 B1* | 8/2001 | Agee et al. ................. | 518/700 |
| 6,302,578 B1 | 10/2001 | Stevenson et al. ........... | 374/179 |
| 6,333,011 B1* | 12/2001 | Schliephake et al. ........ | 422/109 |
| 6,599,011 B1* | 7/2003 | Daily et al. ................. | 374/141 |
| 2001/0055560 A1* | 12/2001 | Schiodt et al. .............. | 423/655 |
| 2002/0085967 A1* | 7/2002 | Yokota ....................... | 422/109 |
| 2002/0159500 A1 | 10/2002 | Green et al. ................ | 374/179 |
| 2003/0172590 A1* | 9/2003 | Bhattacharyya et al. ... | 48/198.7 |

FOREIGN PATENT DOCUMENTS

WO     WO 92/02794     2/1992

OTHER PUBLICATIONS

Cavallaro, S. and Freni, S., "Syngas and electricity production by an integrated autothermal reforming/molten carbonate fuel cell system." Journal of Power Sources Sources (Switzerland), 76(2), p. 190-196, Dec. 1, 1998. , Published: Elsevier.*

Patel, Raj H., et al., "Hydroprocessing Reactor and Process Design to Optimize Catalyst Performance." Presented at The First Indian Refining Roundtable, Dec. 1-2, 1998—New Delhi, India (18 pages, downloaded from Haldor Topsoe website Apr. 2005).*

Bingham, F. E. et al, "Improved Reactor Internals for Syncrude's HGO Hydrotreaters." AM-00-19, Presented at the NPRA 2000 Annual Meeting, Mar. 26-28, 2000—San Antonio, Texas (24 pages, downloaded from Haldor Topsoe website Apr. 2005).*

* cited by examiner

METHOD OF MEASURING HIGH TEMPERATURES AND INSTRUMENT THEREFORE

BACKGROUND OF THE INVENTION

1. Field of the Invention

The invention relates to measurement of high temperatures in chemical reactors. It is specifically directed to measurement of temperatures in catalytic reactors where endothermic reactions are carried out at high temperatures. In the petrochemical industry autothermal reformers are operating under these conditions.

2. Description of Related Art

In autothermal reformers or gasifiers the process gas entering the catalyst bed is typically 1000–1500° C., and the process gas contains hydrocarbons, hydrogen, carbon monoxide, water vapour and sometimes nitrogen. Under these severe conditions the temperature is most often not measured.

A temperature measurement arrangement is disclosed in U.S. Pat. No. 6,302,578 showing a thermowell installed in a thick reactor wall. This is done in such a way that there is a layer of hotface brick between the interior of the reactor and the tip of the thermowell with thermocouple, which thereby is protected against the high temperatures.

In PCT/US91/05432 another high temperature measurement is described. Here the thermocouple is protected by means of layers of ceramic insulation and a ceramic sheath.

However, these instruments are shielded from the reaction gasses and will not give an immediate indication of temperature changes of the gases. This is especially important for temperature of gasses entering a catalyst bed in autothermal reformers, as this temperature is extremely sensitive to changes in flow ratio between hydrocarbon feed and oxygen source.

SUMMARY OF THE INVENTION

The invention provides a method for measurement of high temperatures of a process stream by means of a thermocouple arranged in a thermowell, wherein the thermowell is at least partly covered by a layer of a catalytic material being active in at least one endothermic reaction.

It further relates to a temperature measurement wherein the thermowell is installed in a reactor by inserting the thermowell through a hole in reactor wall so that the tip of the thermowell is in contact with the process stream.

It is thereby possible to let the hot gas stream contact the thermowell, as the endothermic reaction in the catalyst keeps the temperature of the metal surface of the thermowell tip considerably lower than the temperature of the gas. In this way, changes in gas temperature can be instantaneously detected.

DETAILED DESCRIPTION OF THE INVENTION

Figures 1, 2:
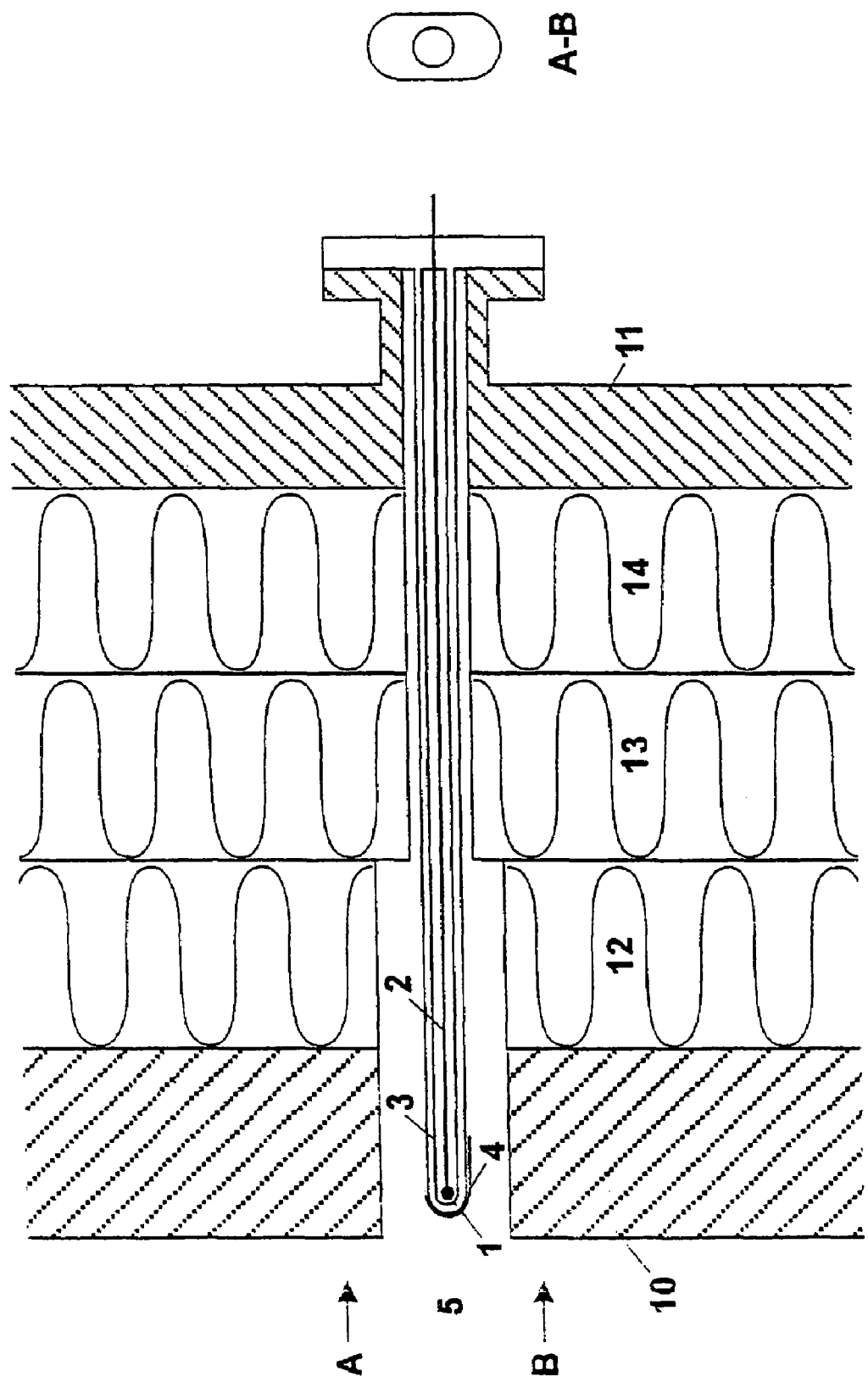
FIG. 1 is a cross sectional view of a temperature-measuring instrument according to a specific embodiment of the invention.
FIG. 2 is a front view of FIG. 1.

The invention is especially directed to temperature measurement in autothermal reformers where hydrocarbons undergo first a partial oxidation and then a reforming process.

The partial oxidation is an exothermic reaction while the reforming process is an endothermic process whereby the first reaction provides heat to the second process.

By the partial oxidation some of the hydrocarbons react to form carbon oxide and steam:

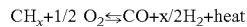
$$CH_x + 1/2\ O_2 \leftrightarrows CO + x/2 H_2 + heat$$

The resulting process gas then undergoes a reforming reaction:

$$C_nH_m + H_2O \leftrightarrows C_{n-1}H_{m-2} + CO + 2H_2 - heat$$

$$CH_4 + H_2O \leftrightarrows CO + 3H_2 - heat$$

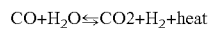
$$CO + H_2O \leftrightarrows CO2 + H_2 + heat$$

The overall reforming is an endothermic reaction.

A hydrocarbon feed gas and an oxygen containing gas are mixed at the inlet of the reactor.

The hydrocarbon feed gas typically contains steam, hydrocarbon, hydrogen and carbon oxides and it is fed to the reformer at temperatures between 100 and 900° C. The oxygen source is pure oxygen, air or any mixture hereof at a temperature between ambient temperature and up to 700° C.

The pressure in the reactor can be 2–8 MPa, most often it is 2.5–5 MPa, and when the feed streams are mixed the exothermic oxidation process starts.

Although the content of oxygen corresponds to only partial combustion of the hydrocarbon the temperature rise is extremely high.

In the space between inlet of reactor and catalyst bed, the endothermic reforming reaction starts due to the high temperature and ends at 1000–1500° C. At steam/carbon ratios of 1.5 this reaction ends at about 1250° C. and at steam/carbon ratio of 0.6 at about 1335° C.

The reaction continues in the catalyst bed to almost complete conversion of hydrocarbons and the temperature of the reacted, reformed process gas is typically 900–1100° C.

By the method of the invention the temperature of the gas entering the catalyst bed is measured by a thermocouple in a thermowell provided with a layer of catalyst being active in catalysing endothermic reactions. Although it is a relatively thin layer and the reaction may not be entirely complete, the endothermic reaction will cool the surface of the thermowell considerably.

At the same time the signal from the temperature instrument of the invention is stronger than one from a measurement of prior art. This is explained below.

In case the oxygen containing feed stream to an autothermal reformer increases during normal operation, an increased amount of hydrocarbon is oxidised. This has both the consequence that the temperatures increase and that the remaining amount of hydrocarbon to be reformed decreases.

At this higher start temperature for the endothermic reaction the conversion is increased in the space without catalyst. Thereby, much less endothermic reaction takes place in the catalyst.

This means that the total temperature drop in the reactor decreases, the temperature drop in the empty space increases and the temperature drop across the catalyst decreases even more than the total decrease of temperature drop.

In this change of operation situation, a conventional temperature instrument installed just upstream of the catalyst detects a corresponding temperature increase, which is lower than the temperature increase at the inlet of the reactor. Contrary to this, a temperature instrument of the invention detects a temperature increase corresponding to catalyst outlet temperature, and this temperature increase is even higher than the temperature increase at the inlet of the reactor.

The same difference in temperature change also applies, when the relative oxygen amount decreases.

The above illustrates that the invention has the advantages of measuring the temperature with a much lower metal surface temperature of creating a stronger signal and of measuring the gas itself inlet the catalyst bed. Measuring the catalyst outlet gas or measuring behind a shield would create a considerable time delay.

The temperature of the partially combusted process gas is very sensitive to the ratio between flow of hydrocarbon and flow of oxygen source.

Consequently, it is highly desired to detect a change ink this temperature as quickly as possible. This is possible with the temperature measurement of the invention.

One preferred embodiment of the invention is shown on FIG. 1. The measuring junction 1 of the thermocouple 2 is installed in the tip of thermowell 3, and the tip of the thermowell is covered by a catalytic layer 4. This is in contact with process gas in the reactor chamber 5. The inner surface of the reactor wall is covered by tiles 10, which are able to withstand the high reaction temperatures. The outer surface of the reactor wall is the reactor shell 11, which is designed for the full operation pressure. Between 10 and 11 three layers of insulating refractory material 12, 13 and 14 are installed.

The tip of the thermowell is somewhat withdrawn from the inner surface of the reactor wall to protect it against radiation from the flame at top of the reactor. The tip of the thermowell is 20–50 mm from the inner surface of the wall.

As the thermal expansion of the tiles and refractory differs from the one of the metal pressure shell, to which the thermowell is connected, the height of the hole in the tiles and outer refractory layer will be bigger than the width of the hole. The dimensions are adapted to the thermal expansions, which in industrial autothermal reformers typically are a height of 80–100 mm and a width of 35–40 mm. This is further illustrated on FIG. 2.

On the thermowell the thickness of the catalyst layer 4 is from 0.2 to 0.5 mm. In another embodiment the thermowell tip is inserted into a catalyst tablet and then the "catalyst layer" is 0.5–5 mm most often 0.5–2 mm.

20–200 mm of the end of the thermowell can be covered by the catalytic material; most often 40–80 mm is covered.

The catalyst 4 can be any catalyst active in reforming reaction. Especially the catalysts with noble metals are very suitable.

Figure 3:
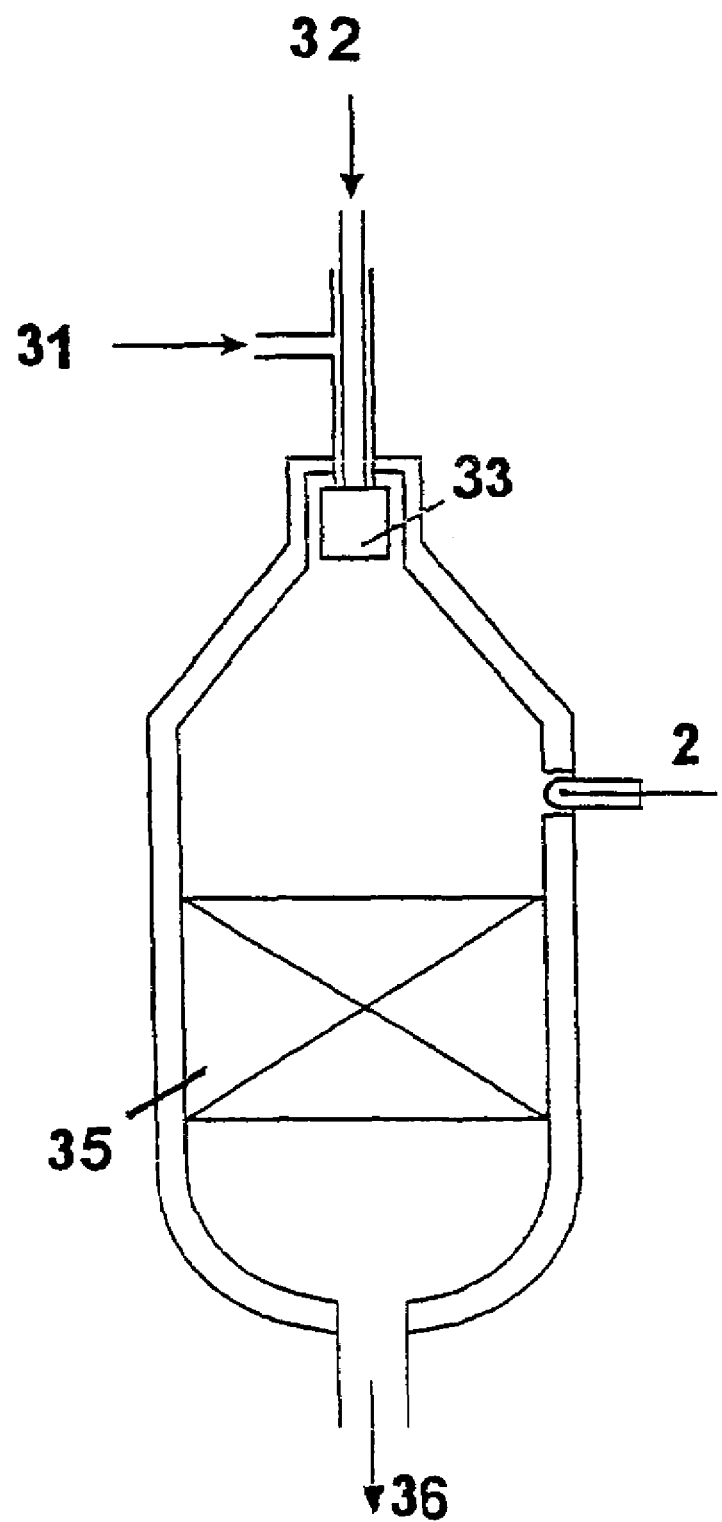
FIG. 3 shows a typical installation of the measuring instrument shown in the above Figures.

FIG. 3 shows where a thermowell of the invention can be installed in an autothermal reformer. The hydrocarbon feed 31 is mixed with the oxygen containing feed 32 and the partial combustion takes place in burner 33. The process gas temperature is measured by thermocouple 2, before entering catalyst bed 35 where it is completely reformed to product gas 36.

In the industry the invention is useful in gasifiers, such as autothermal reformers producing synthesis gas in ammonia plants, hydrogen plants, methanol plants and $H_2/CO$ gas plants. In all these reactors it is very important to thoroughly supervise their performance and especially temperatures in order to obtain a stable and safe operation.

EXAMPLE

In a test pilot plant having an adiabatic reactor two experiments at autothermal reforming conditions were conducted.

In both experiments the pressure was 28 kg/cm² g (2.8 MPa).

The hydrocarbon feed was 97.4 Nm³/h natural gas with 2 Nm³/h hydrogen at 562° C.

Steam/carbon ratio was 0.38 (on molar basis).

The oxygen was fed at 219° C.

Two thermocouples TI-1 and TI-2 were installed measuring the gas entering the catalyst bed.

TI-3 measured the gas exit the catalyst bed.

Following results were obtained:

|  | 1st experiment | 2nd experiment |
|---|---|---|
| Measured data |  |  |
| $O_2$/natural gas, by volume | 0.519 | 0.576 |
| TI-1, ° C. | 1163 | 1201 |
| TI-2, ° C. | 1184 | 1221 |
| TI-3, ° C. | 991 | 1068 |
| Calculated data |  |  |
| T, inlet, average | 1174 | 1211 |
| ΔT, inlet-exit | 183 | 143 |
| Increase of T, inlet, average from 1st to 2nd experiment | 37 |  |
| Increase of T, outlet from 1st to 2nd experiment | 77 |  |

This demonstrates that when the oxygen content increases, the reaction and the temperature drop decreases in the catalyst bed. Also, the increase from experiment 1 to 2 of catalyst inlet temperature is less than the increase of catalyst outlet temperature. From this it appears that a catalyst coated thermowell installed thermocouple gives a stronger signal and with a lower metal surface temperature.

The invention claimed is:

1. A method for measurement of high temperatures of a process stream, the method comprising the steps of:
   providing a thermocouple arranged in a thermowell, wherein a layer of catalytic material is formed on and at least partly covers the thermowell;
   inserting the thermowell into a reactor wall, which is part of a reactor, so that a tip of the thermowell does not penetrate an inner chamber of the reactor;
   conducting in a process stream at least one endothermic catalyzing steam reforming reaction, wherein the layer of catalytic material is active in the at least one endothermic catalyzing steam reforming reaction; and
   contacting the thermowell with the process stream during the endothermic catalyzing steam reforming reaction, to carry out the temperature measurement.

2. The method according to claim 1, wherein the tip of the thermowell is covered by the catalytic material with a layer thickness of 0.2–5 mm.

3. The method according to claim 2, wherein the layer thickness is 0.5–2 mm.

4. The method according to claim 1, wherein the thermowell is installed in the reactor wall by inserting the thermowell through a hole penetrating the reactor wall so that the tip of the thermowell is in contact with the process stream.

5. The method according to claim 1, wherein the process stream further undergoes the steam reforming reaction in a catalytic bed.

6. The method according to claim 5, wherein the steam reforming reaction is carried out in an autothermal reformer.

7. The method according to claim 1, wherein the measured process stream has a temperature of 1000–1500° C.

8. A method for measurement of high temperatures of a process stream, the method comprising the steps of:
providing a thermocouple arranged in a thermowell, wherein the thermowell is at least partly covered by a layer of a catalytic material-being active in at least one endothermic catalyzing steam reforming reaction; and
contacting the thermowell with a process stream during the endothermic catalyzing steam reforming reaction, to carry out the temperature measurement,
wherein the thermowell is installed in a reactor wall by inserting the thermowell through a hole penetrating the reactor wall so that the tip of the thermowell is in contact with the process stream and is 20–50 mm behind an inner surface of the reactor wall.

9. A method for measurement of high temperatures of a process stream, the method comprising the steps of:
providing a thermocouple arranged in a thermowell, wherein the thermowell is at least partly covered by a layer of a catalytic material-being active in at least one endothermic catalyzing steam reforming reaction; and
contacting the thermowell with a process stream during the endothermic catalyzing steam reforming reaction, to carry out the temperature measurement,
wherein the process stream undergoes the steam reforming reaction in a catalytic bed and wherein the temperature is measured upstream of the catalyst bed.

10. A temperature measurement instrument comprising a thermocouple inserted in a thermowell, wherein a layer of catalytic material is formed on and at least partly covers the thermowell, and wherein the layer of catalytic material is active in at least one endothermic catalyzing steam reforming reaction, and wherein the thermowell is inserted into a reactor wall, which is part of a reactor, so that a tip of the thermowell does not penetrate an inner chamber of the reactor.

11. A method for measurement of high temperatures of a process stream, the method comprising the steps of:
providing a thermocouple arranged in a thermowell, wherein a layer of catalytic material is formed on and at least partly covers the thermowell;
inserting the thermowell into a reactor wall, which is part of a reactor, so that a tip of the thermowell does not penetrate an inner chamber of the reactor;
conducting in a process stream at least one endothermic catalyzing steam reforming reaction, wherein the layer of catalytic material is active in the at least one endothermic catalyzing steam reforming reaction;
cooling the thermowell by contacting the thermowell with the process stream during the endothermic catalyzing steam reforming reaction; and
carrying out temperature measurements.

* * * * *